April 1, 1930.  P. BOLLINGER  1,752,364

ARMATURE VENTILATION

Filed Feb. 6, 1929   2 Sheets-Sheet 1

INVENTOR
Paul Bollinger.
BY
ATTORNEY

April 1, 1930. P. BOLLINGER 1,752,364
ARMATURE VENTILATION
Filed Feb. 6, 1929 2 Sheets-Sheet 2

INVENTOR
Paul Bollinger.
BY
Wesley G. Carr
ATTORNEY

Patented Apr. 1, 1930

1,752,364

UNITED STATES PATENT OFFICE

PAUL BOLLINGER, OF WILKINSBURG, PENNSYLVANIA, ASSIGNOR TO WESTINGHOUSE ELECTRIC & MANUFACTURING COMPANY, A CORPORATION OF PENNSYLVANIA

ARMATURE VENTILATION

Application filed February 6, 1929. Serial No. 337,954.

My invention relates to ventilation of dynamo electric machines, and more particularly to a system of ventilating rotor armatures thereof.

In electric railway locomotives, the space which is allotted to the propelling motors beneath the floor of the cab and between the wheels, is very limited. Hence, in the construction of such motors, any proposed change by which the output of a given size of motor may be increased is carefully considered.

Heretofore, the air which has been utilized for cooling the rotor armature has been taken into the motor from its commutator end. Owing to the fact that the internal diameter of the rotor at this end is considerably smaller than at its opposite end, it is found impossible, in large traction motors, to obtain, through this opening, a sufficient volume of air for cooling the armature.

Therefore, it is an object of my invention to depart from the present system of ventilating armatures in railway motors and pass the cooling air into the motor from its pinion end, and, by so doing, I am enabled to project the bearing located on the commutator end into the opening at the commutator end of the armature, substantially closing the same, hence making provision whereby the overall lengths of the windings may be increased, thereby obtaining a higher rating for a given space.

By my arrangement, the cooling air is taken into the armature spider from its pinion end, passing longitudinally under the armature core to the commutator end, where it is directed outwardly, by means of a radially extending flange, to the further ends of longitudinal passages in the armature core, through which it passes, thus effecting a U-turn in its path and leaving the armature from the same end at which it enters.

Figure 1:
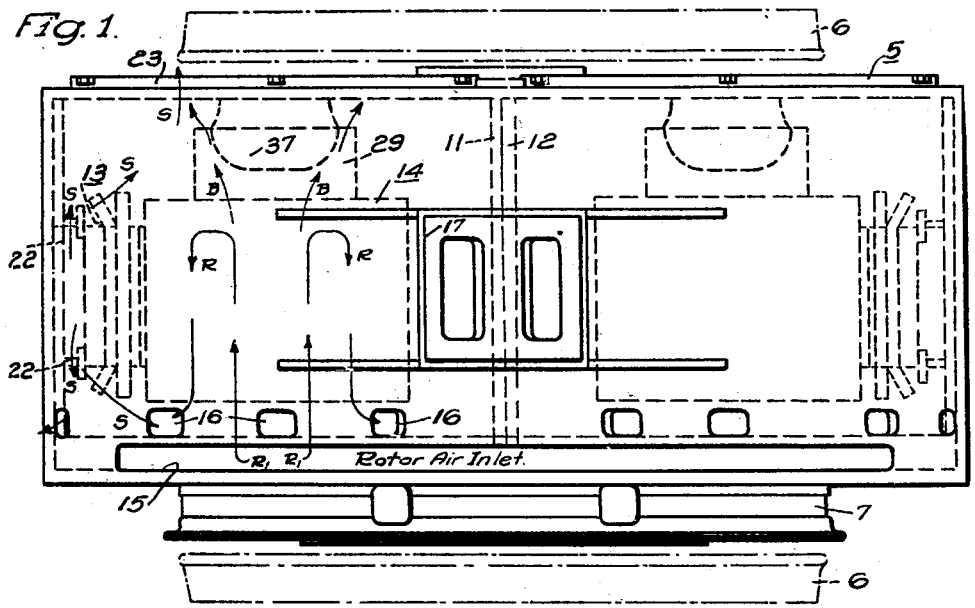
Figure 2:
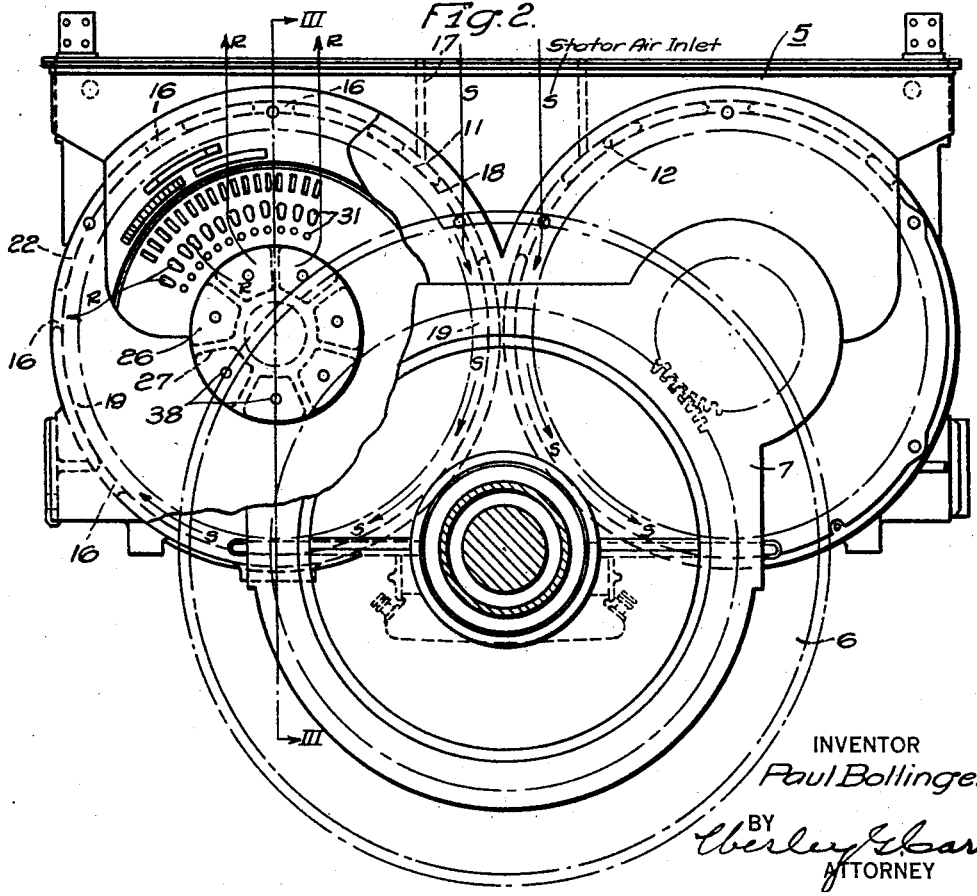
Figure 3:
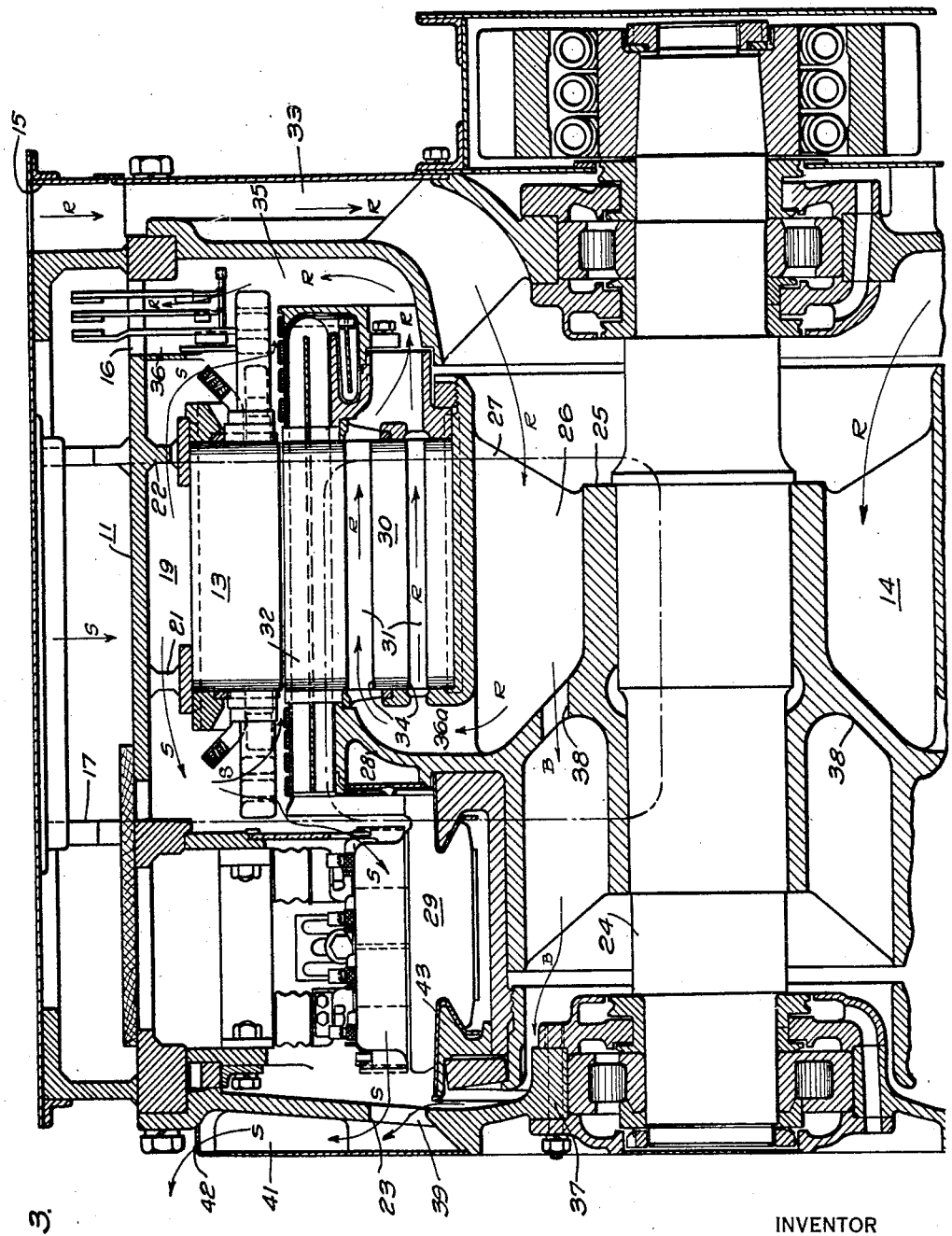

A better understanding of the details and advantages of my invention may be found in the following description and claims, taken in connection with the accompanying drawing, in which Figure 1 is a plan view showing a railway motor of the twin type, disposed between the locomotive wheels, embodying my invention;

Fig. 2 is a view, in elevation, showing the pinion ends of the motors and the gearing connection to the locomotive wheels; and Fig. 3 is a view, in section taken along the line III—III of Fig. 2, showing more in detail the specific arrangement of structure utilized in carrying out my invention.

In all of the figures, the path of the ventilating air for cooling the stator is indicated by arrows marked with the letter "S" while the path of the air for cooling the rotor is indicated by arrows marked with the letter "R". Also the path for the air which passes over the commutator end bearing is indicated by arrows marked with the letter "B".

A blower arrangement, not shown, is located on the top of the casing for blowing a blast of air into the inlet openings 15 and 17 at a rate of the order of 3000 cu. ft. per minute through each opening.

In Fig. 3 is illustrated more in detail the specific structure utilized in carrying out my invention. The rotor armature 14 comprises a shaft 24, a spider 25 having longitudinally extending passages 26 between adjacent spider arms 27 thereof and having a radially extending flange or curved guide 28, a commutator cylinder 29, and an armature core 30 having longitudinal ventilating passages 31 and windings 32.

The cooling air is forced downwardly into the inlet opening 15 through a passageway 33 which is provided, externally of the main part of the end frame, and upon nearing the spider makes a sweeping turn into the spider. After the air is admitted to the spider, its velocity is maintained by fan action of the spider arms 27. Upon passing longitudinally of the spider, it is directed radially by means of the radially extending flange 28 to the entrance 34 of the longitudinal passages 31 of the armature core, from which it finally discharges into a passageway 35, adjacent to the entrance passageway 33, over stator leads 36, and leaves through the circumferentially disposed outlet openings 16 of the frame. Impeller blades 36a provided in the radially-extending passage alongside of the guide 28, serve as means for maintaining a steady flow of cooling air.

In Figs. 1 and 2, is illustrated a railway motor 5 of the twin type, geared to locomotive wheels 6 through a gearing arrangement included within the gear casing 7. The twin motor 5 comprises, in general, two barrel-shaped frames 11 and 12, attached to each other in side-by-side relation, each enclosing a motor comprising a stator 13 and a rotor armature 14, as shown in Fig. 3.

In each individual motor, the ventilation of the rotor is separate from the ventilation of the stator. The cooling air which enters the rotor is taken through an oblong-shaped opening 15 at the pinion end thereof, and it leaves the casing through a plurality of openings 16 circumferentially spaced in the barrel frame and adjacent to the oblong opening.

The air utilized for ventilating the stator of each of the motors is taken in through a central passage 17, from which it is directed through an opening 18 into an annular passageway 19 about the periphery of the core of the stator and thence longitudinally of the motor through openings 21 in a radially-extending portion 22 utilized for spacing the stator 13 from the barrel frame 11 or 12. A part of the stator air passes toward the commutator end, over the end of the stator windings and over the commutator, and leaving the motor through openings 23 in the bearing housing at the commutator end, while the other part of the stator air passes toward the pinion end of the motor through the stator end windings, and outwardly through the openings 16, along with the air leaving the armature. Some of the stator air, instead of passing over the commutator as above described, passes back through the air-gap to the pinion end of the motor, where it leaves by the outlets 16.

Since the air is taken into the armature from the pinion end, the bearing 37 carried by the commutator end-plate of the motor-frame may project in underneath the commutator cylinder 29 and substantially close the end thereof. In order to prevent negative pressure or dead air around the bearing, that would tend to cause inward flow of oil from bearing into the motor, a by-pass opening 38 is provided in the flange 28 for taking some of the rotor air from the spider, whence it circulates over the bearing, leaving the motor at the commutator end thereof, as indicated by arrows marked with letter "B".

In addition to the impeller means 36a within the armature spider for bolstering the velocity of the ventilating air, it will be noted that the cross-section of the entire ventilating path, through the spider and the core, decreases substantially in cross-sectional area as the air progresses.

The air for ventilating the stator passes through the stator, as explained hereinbefore, the main portion passing over the commutator and leaving through the bearing housing along with the rotor air that passes over the commutator-end bearing 37.

The commutator-end bearing-housing assembly includes radially-extending passages 39 which allow the air to pass outwardly into annular passages 41 which are connected to the atmosphere through openings 42, with the object in view of protecting the commutator from water that is pitched by the wheel 6.

At both ends of the machine, it should be noticed that, by my construction, the bearing housings, transmitting the armature load to the motor frame, are practically flat discs, light in weight, and radially very stiff instead of being disposed out of vertical alinement with the end of the motor frame as practiced heretofore.

Another advantage obtained by my novel ventilating construction herein described is that access is had to the loose commutator V-ring 43 which can be put on the front end of the commutator, thereby providing a commutator structure that is separate and independent from the armature core. The details of the commutator structure per se constitute the subject-matter of a copending application by G. A. Moore, Serial No. 384,947, filed August 10, 1929, for a disc spring for commutator V-rings, (Case 14,654).

It is also advantageous to make the radial guide or flange 28 an integral part of the armature spider so that it provides a means for sealing the rear end of the commutator from oil and moisture that may be brought into the motor by the rotor cooling air.

Various changes may be made in the details of the construction utilized in carrying out my system of ventilating rotor armatures, which has been herein described, but it is intended that the present invention be limited to the ventilating system and to the several features relating thereto, as defined by the appended claims.

I claim as my invention:

1. In a dynamo-electric machine, a machine casing provided with ventilating openings, a stator, a rotor comprising a spider member having longitudinal passages, an armature core having longitudinal passages, means for directing ventilating fluid entering said casing to the mouth of the spider passages, said spider having a radially-extending flange portion for causing the ventilating fluid passing through the spider to be directed to the inner end of the armature core and into said ventilating passages thereof.

2. In a dynamo-electric machine, a machine casing provided with ventilating openings, a separately-ventilated stator, a rotor comprising a spider having ventilating passages and an armature core having longitudinal passages, means for directing the ventilating fluid entering said casing to the mouth of said spider passages, said spider having a radially-extending flange portion including a portion of the spider passages, and for directing the ventilating fluid into longitudinal passages at the inner end of the armature core, said rotor ventilating-fluid passages, in their entirety, being so shaped as to substantially present a reducing cross-sectional area to ventilating fluid passing therethrough.

3. In a dynamo-electric machine, a machine casing provided with ventilating openings, a stator, a rotor comprising a spider member having longitudinal passages, means for directing the ventilating fluid entering said casing to the mouth of the spider passages, said spider having a radially-extending flange portion for causing the ventilating fluid passing through the spider to be directed to the inner end of the armature core and into the passages thereof, and impeller means in the path of said ventilating fluid.

4. In a dynamo-electric machine, a machine casing provided with ventilating openings, a separately-ventilated stator, a rotor comprising a spider having ventilating passages and an armature core having longitudinal passages, means for directing the ventilating fluid entering said casing to the mouth of said spider passages, said spider having a radially-extending flange portion including a portion of the spider passages and for directing the ventilating fluid into longitudinal passages at the inner end of the armature core, said rotor passages, in their entirety, being so shaped as to substantially present a reducing cross-sectional area to ventilating fluid passing therethrough, and impeller means in the path of said ventilating fluid.

5. In a dynamo-electric machine, a machine casing for totally enclosing said machine, and having ventilating openings and passages therein, a stator, a rotor-member commutating structure, means for directing ventilating fluid over said stator and said commutating structure, a separately-ventilated rotor portion comprising a shaft, an armature spider having ventilating passages and means for closing said passages at the commutator end thereof, and an armature core having longitudinal ventilating passages, an end plate of said casing, a bearing carried by said end plate and projecting into said commutator structure substantially closing the end thereof, and means for delivering ventilating fluid to said armature.

6. In a dynamo-electric machine, a machine provided with ventilating openings, a stator, a rotor comprising an armature spider having ventilating passages, an armature core having longitudinal ventilating passages, a commutator cylinder, and means for directing ventilating fluid, entering said spider at the end thereof opposite to said commutator cylinder into the armature core passage, a bearing housing, a bearing carried by said housing and projecting into said commutator cylinder, and by-pass means for admitting a small amount of the ventilating fluid passing through said spider, into a region surrounding said bearing.

7. A railway motor comprising two bearings, an overhung pinion at one end, and a rotor-member current-collecting device at the other end, characterized by having an armature spider, a current-collector supporting cylinder, an armature core on the armature spider, said core having longitudinally extending ventilating passages, an end frame at the pinion end provided with ventilating passages for leading a cooling fluid radially inward and curving it into the open end of the armature spider underneath the armature core, a radially extending guide member between the armature spider and the current-collector supporting cylinder for directing a major portion of the rotor cooling fluid outwardly and returning the same through the core passages to the pinion end of the machine, said end frame at the pinion end being further provided with means for directing the discharged rotor air in a radial outward direction, and means for maintaining the aforesaid flow of cooling fluid.

8. A railway motor comprising two bearings, an overhung pinion at one end, and a rotor-member current-collecting device at the other end, characterized by having an armature spider, a current-collector supporting cylinder, an armature core on the armature spider, said core having longitudinally extending ventilating passages, an end frame at the pinion end provided with ventilating passages for leading a cooling fluid radially inward and curving it into the open end of the armature spider underneath the armature core, a radially extending guide member between the armature spider and the current-collector supporting cylinder for directing a major portion of the rotor cooling fluid outwardly and returning the same through the core passages to the pinion end of the machine, said end frame at the pinion end being further provided with means for directing the discharged rotor air in a radial outward direction, a substantial portion of the bearing at the current-collector end being disposed in nested relation within the free end of the current-collector cylinder, and means for maintaining the aforesaid flow of cooling fluid.

9. A railway motor comprising two bearings, an overhung pinion at one end, and a rotor-member current-collecting device at the other end, characterized by having an armature spider, a current-collector supporting cylinder, an armature core on the armature spider, said core having longitudinally extending ventilating passages, an end frame at the pinion end provided with ventilating passages for leading a cooling fluid radially inward and curving it into the open end of the armature spider underneath the armature core, a radially extending guide member between the armature spider and the current-collector supporting cylinder for directing a major portion of the rotor cooling fluid outwardly and returning the same through the core passages to the pinion end of the machine, said end frame at the pinion end being further provided with means for directing the discharged rotor air in a radial outward direction, a substantial portion of the bearing at the current-collector end being disposed in nested relation within the free end of the current-collector cylinder, the bearing at the pinion end being nested within the end frame underneath the passages for leading the incoming cooling fluid into the armature spider, and means for maintaining the aforesaid flow of the cooling fluid.

10. A railway motor comprising two bearings, an overhung pinion at one end, and a rotor-member current-collecting device at the other end, characterized by having an armature spider, a current-collector supporting cylinder, an armature core on the armature spider, said core having longitudinally extending ventilating passages, an end frame at the pinion end provided with ventilating passages for leading a cooling fluid radially inward and curving it into the open end of the armature spider underneath the armature core, a radially extending guide member between the armature spider and the current-collector supporting cylinder for directing a major portion of the rotor cooling fluid outwardly and returning the same through the core passages to the pinion end of the machine, said end frame at the pinion end being further provided with means for directing the discharge rotor air in a radial outward direction, a substantial portion of the bearing at the current-collector end being disposed in nested relation within the free end of the current-collector cylinder, the aforesaid radially extending guide member being provided with a bypass opening for directing some of the rotor cooling fluid underneath the current-collector cylinder and over the bearing therein, and means for maintaining the aforesaid flow of cooling fluid.

11. A railway motor comprising two bearings, an overhung pinion at one end, and a rotor-member current-collecting device at the other end, characterized by having a stator member having a space surrounding the stator core, means for leading a cooling fluid into said space and discharging it radially inwardly at both ends of the stator member, means for directing the stator cooling fluid at the current-collector end of the machine over the current-collecting device, an end frame at the pinion end of the machine provided with means for directing the stator cooling fluid in a radially outward direction, stator leading-in conductors disposed in said radially outwardly directed stator cooling fluid, and means for maintaining the aforesaid flow of cooling fluid.

12. A railway motor comprising two bearings, an overhung pinion at one end, and a rotor-member current-collecting device at the other end, characterized by having an armature spider, a current-collector supporting cylinder, an armature core on the armature spider, said core having longitudinally extending ventilating passages, an end frame at the pinion end provided with ventilating passages for leading a cooling fluid radially inward and curving it into the open end of the armature spider underneath the armature core, a radially extending guide member between the armature spider and the current-collector supporting cylinder for directing a major portion of the rotor cooling fluid outwardly and returning the same through the core passages to the pinion end of the machine, said end frame at the pinion end being further provided with means for directing the discharged rotor air in a radial outward direction, a stator member having a space surrounding the stator core, means for leading a cooling fluid into said space and discharging it radially inwardly at both ends of the stator member, means for directing the stator cooling fluid at the current-collector end of the machine over the current-collecting device, the discharged stator cooling fluid at the pinion end of the machine being directed in a radial outward direction parallel to the discharged rotor cooling fluid, stator leading-in conductors disposed in said discharged cooling fluid at the pinion end, and means for maintaining the aforesaid flow of cooling fluid.

13. A railway motor comprising two bearings, an overhung pinion at one end, and a rotor-member current-collecting device at the other end, characterized by having an armature spider, a current-collector supporting cylinder, an armature core on the armature spider, said core having longitudinally extending ventilating passage, an end frame at the pinion end provided with ventilating passages for leading a cooling fluid radially inward and curving it into the open end of the armature spider underneath the armature core, a radially extending guide member between the armature spider and the current-collector supporting cylinder for directing a major portion of the rotor cooling fluid outwardly and returning the same through the core passages to the pinion end of the machine, said end frame at the pinion end being further provided with means for directing the discharged rotor air in a radial outward direction, a stator member having a space surrounding the stator core, means for leading a cooling fluid into said space and discharging it radially inwardly at both ends of the stator member, means for directing the stator cooling fluid at the current-collector end of the machine over the current-collecting device, the discharged stator cooling fluid at the pinion end of the machine being directed in a radial outward direction parallel to the discharged rotor cooling fluid, stator leading-in conductors disposed in said discharged cooling fluid at the pinion end, a substantial portion of the bearing at the current-collector end being disposed in nested relation within the free end of the current-collector cylinder, the aforesaid radially extending guide member being provided with a bypass opening for directing some of the rotor cooling fluid underneath the current-collector cylinder and over the bearing therein, the bearing at the pinion end being nested within the end frame underneath the passages for leading the incoming cooling fluid into the armature spider, and means for maintaining the aforesaid flow of cooling fluid.

14. A railway motor comprising two bearings, an overhung pinion at one end, and a rotor-member current-collecting device at the other end, characterized by having an armature spider, a current-collector supporting cylinder, an armature core on the armature spider, said core having longitudinally extending ventilating passages, an end frame at the pinion end provided with ventilating passages for leading a cooling fluid radially inward and curving it into the open end of the armature spider underneath the armature core, a radially extending guide member between the armature spider and the current-collector supporting cylinder, a substantial portion of the bearing at the current-collector end being disposed in nested relation within the free end of the current-collector cylinder, and means for maintaining the aforesaid flow of cooling fluid.

15. A railway motor comprising two bearings, an overhung pinion at one end, and a rotor-member current-collecting device at the other end, characterized by having an armature spider, a current-collector supporting cylinder, an armature core on the armature spider, said core having longitudinally extending ventilating passages, an end frame at the pinion end provided with ventilating passages for leading a cooling fluid radially inward and curving it into the open end of the armature spider underneath the armature core, a radially extending guide member between the armature spider and the current-collector supporting cylinder, the bearing at the pinion end being nested within the end frame underneath the passages for leading the incoming cooling fluid into the armature spider, and means for maintaining the aforesaid flow of cooling fluid.

16. A railway motor comprising two bearings, an overhung pinion at one end, and a rotor-member current-collecting device at the other end, characterized by having an armature spider, a current-collector supporting cylinder, an armature core on the armature spider, said core having longitudinally extending ventilating passages, an end frame at the pinion end provided with ventilating passages for leading a cooling fluid radially inward and curving it into the open end of the armature spider underneath the armature core, means for causing some of the rotor cooling fluid from said armature spider to move radially outward at the current-collector end of said spider, a substantial portion of the bearing at the current-collector end being disposed in nested relation within the free end of the current-collector cylinder, the bearing at the pinion end being nested within the end frame underneath the passages for leading the incoming cooling fluid into the armature spider, and means for maintaining a circulation of cooling fluid in the machine.

17. A railway motor comprising two bearings, an overhung pinion at one end, and a rotor-member current-collecting device at the other end, characterized by having a stator member having a space surrounding the stator core, means for leading a cooling fluid into said space and discharging it radially inwardly at both ends of the stator member, an end frame at the pinion end of the machine provided with means for directing the stator cooling fluid in a radially outward direction, stator leading-in conductors disposed in said radially outwardly directed stator cooling fluid, and means for maintaining the aforesaid flow of cooling fluid.

18. A railway motor comprising two bearings, an overhung pinion at one end, and a rotor-member current-collecting device at the other end, characterized by having an armature spider, a current-collector supporting cylinder, an armature core on the armature spider, said core having longitudinally extending ventilating passages, an end frame at the pinion end provided with ventilating passages for leading a cooling fluid radially inward and curving it into the open end of the armature spider underneath the armature core, a radially extending guide member between the armature spider and the current-collector supporting cylinder for directing a major portion of the rotor cooling fluid outwardly and returning the same through the core passages to the pinion end of the machine, said end frame at the pinion end being further provided with means for directing the discharged rotor air in a radial outward direction, a stator member having a space surrounding the stator core, means for leading a cooling fluid into said space and discharging it radially inwardly at both ends of the stator member, the discharged stator cooling fluid at the pinion end of the machine being directed in a radial outward direction parallel to the discharged rotor cooling fluid, and means for maintaining the aforesaid flow of cooling fluid.

19. A railway motor comprising two bearings, an overhung pinion at one end, and a rotor-member current-collecting device at the other end, characterized by having an armature spider, a current-collector supporting cylinder, an armature core on the armature spider, said core having longitudinally extending ventilating passages, an end frame at the pinion end provided with ventilating passages for leading a cooling fluid radially inward and curving it into the open end of the armature spider underneath the armature core, means for causing some of the rotor cooling fluid from said armature spider to move radially outward at the current-collector end of said spider, commutator segments on said current-collector supporting cylinder, a stationary V-ring for retaining said segments at the inner end thereof, and a removable V-ring for retaining said segments at the outer end thereof.

20. A railway motor comprising two bearings, an overhung pinion at one end, and a rotor-member current-collecting device at the other end, characterized by having an armature spider, a current-collector supporting cylinder, an armature core on the armature spider, said core having longitudinally extending ventilating passages, an end frame at the pinion end provided with ventilating passages for leading a cooling fluid radially inward and curving it into the open end of the armature spider underneath the armature core, a commutator cylinder mounted on said current-collector supporting cylinder, and a solid radial flange integral with said supporting cylinder and said armature spider for protecting said commutator cylinder from the rotor ventilating fluid.

21. A railway motor comprising two bearings, an overhung pinion at one end, and a rotor-member current-collecting device at the other end, characterized by having a current-collector supporting cylinder, an armature spider, an armature core on the armature spider, said core having longitudinally extending ventilating passages, an end frame at the pinion end having two separate radial ventilating spaces having curved inner ends communicating respectively with the armature spider and the armature core passages, the bearing at the pinion end being nested within the end frame underneath said curved inner ends, a baffle at the inner end of the current-collector for providing a communication between the armature spider and the armature core passages, a motor frame having four ventilating openings as follows: a ventilating opening in the top of the frame communicating with the outer one of the two radial ventilating spaces in the end frame at the pinion end; a ventilating opening, adjacent to the first-mentioned opening, communicating both with the inner one of said two radial ventilating spaces and with the end space of the stator member of the motor; a ventilating opening in the top of the frame communicating with the space around the stator core member; and a ventilating opening in the end frame at the current-collector end adjacent to said current collector; and means for maintaining a circulation of ventilating fluid through the motor.

In testimony whereof, I have hereunto subscribed my name this 4th day of February, 1929.

PAUL BOLLINGER.